(12) United States Patent
Lee et al.

(10) Patent No.: US 8,508,703 B2
(45) Date of Patent: Aug. 13, 2013

(54) DISPLAY DEVICE

(75) Inventors: Dong-Hwan Lee, Yongin (KR);
Young-Sam Seo, Yongin (KR);
Chung-Soo Ha, Yongin (KR);
Young-Duek Kim, Yongin (KR);
Jin-Sung Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 196 days.

(21) Appl. No.: 12/962,904

(22) Filed: Dec. 8, 2010

(65) Prior Publication Data

US 2012/0019758 A1    Jan. 26, 2012

(30) Foreign Application Priority Data

Jul. 26, 2010    (KR) .......................... 10-2010-0071898

(51) Int. Cl.
*G02F 1/1335*    (2006.01)
(52) U.S. Cl.
USPC .......................................................... 349/137

(58) Field of Classification Search
None
See application file for complete search history.

(56) References Cited

U.S. PATENT DOCUMENTS

| | | | | |
|---|---|---|---|---|
| 3,235,397 A * | 2/1966 | Millendorfer | ................. | 359/588 |
| 4,944,986 A * | 7/1990 | Zuel | ............................... | 428/156 |
| 4,964,701 A * | 10/1990 | Dorschner et al. | ............ | 349/202 |
| 5,744,819 A * | 4/1998 | Yamamoto et al. | ............. | 257/59 |
| 5,783,299 A * | 7/1998 | Miyashita et al. | ............. | 428/329 |
| 5,838,415 A * | 11/1998 | Hayashi et al. | ............... | 349/161 |
| 7,268,841 B2 * | 9/2007 | Kasajima et al. | ............... | 349/96 |
| 2001/0053034 A1 * | 12/2001 | Ikuhara et al. | ................ | 359/885 |
| 2002/0021393 A1 * | 2/2002 | Ochiai et al. | ................. | 349/137 |

FOREIGN PATENT DOCUMENTS

| | | |
|---|---|---|
| JP | 07-005452 A | 1/1995 |
| JP | 09-288202 A | 11/1997 |
| JP | 2003-195005 A | 7/2003 |
| JP | 2004-202996 | 7/2004 |
| KR | 10 2003-0092340 A | 12/2003 |
| KR | 10-2008-0052848 | 6/2008 |

* cited by examiner

*Primary Examiner* — Lucy Chien
(74) *Attorney, Agent, or Firm* — Lee & Morse, P.C.

(57) ABSTRACT

An exemplary embodiment provides a display device that includes: a display panel; a window positioned on the display panel; and an anti-reflection layer coated on the window.

13 Claims, 6 Drawing Sheets

FIG. 4

| NO | Thickness of each layer (Å) | | | | | Total thickness | Average reflectivity |
|---|---|---|---|---|---|---|---|
| | 410(TiO$_2$) | 420(SiO$_2$) | 430(TiO$_2$) | 440(SiO$_2$) | 500(AF) | | Average transmittance |
| Experimental example 1 | 101 | 194 | 850 | 643 | 172 | 1960 | 0.60% |
| | | | | | | | 94.60% |
| Experimental example 2 | 104 | 198 | 873 | 657 | 147 | 1979 | 0.70% |
| | | | | | | | 94.70% |
| Experimental example 3 | 104 | 198 | 873 | 657 | 188 | 2020 | 0.70% |
| | | | | | | | 94.50% |
| Experimental example 4 | 108 | 205 | 907 | 678 | 187 | 2085 | 0.70% |
| | | | | | | | 93.70% |
| Experimental example 5 | 112 | 211 | 940 | 699 | 171 | 2133 | 0.60% |
| | | | | | | | 94.20% |
| Experimental example 6 | 115 | 215 | 962 | 713 | 207 | 2212 | 0.70% |
| | | | | | | | 94.20% |
| Experimental example 7 | 117 | 219 | 984 | 727 | 175 | 2222 | 0.60% |
| | | | | | | | 93.70% |

DISPLAY DEVICE

CROSS-REFERENCE TO RELATED APPLICATION

This application claims priority to and the benefit of Korean Patent Application No. 10-2010-0071898, filed in the Korean Intellectual Property Office on Jul. 26, 2010, the disclosure of which is incorporated herein, by reference.

BACKGROUND

1. Field

The described technology relates generally to a display device, and more particularly, to a display device including a window.

2. Description of the Related Art

A display device which displays an image may be classified as a liquid crystal display, a plasma display, or an organic light emitting diode display, in accordance with the type of a display panel included in the display device.

A known display device protects the display panel with a window formed on the display panel. An anti-reflection (AR) layer is positioned between the window and the display panel, in order to prevent external light from being internally reflected by the display device. However, when the AR layer is positioned between the window and the display panel, it is difficult to prevent external light from being reflected by the window.

The above information disclosed in this Background section is only for enhancement of understanding of the background of the described technology and therefore it may contain information that does not constitute prior art.

SUMMARY

The described technology has been made in an effort to provide a display device having improved external light reflection prevention capabilities.

An exemplary embodiment provides a display device that includes: a display panel; a window positioned on the display panel, including a first surface facing the display panel and an opposing second surface; and an anti-reflection layer coated on the second surface.

According to various embodiments, the anti-reflection layer may include an anti-reflection (AR) coating.

According to various embodiments, the anti-reflection layer may include a plurality of layers having different refractive indexes, which are alternately laminated to each other.

According to various embodiments, the layers may have different thicknesses.

According to various embodiments, one of the layers may include titanium oxide $TiO_2$ and another layer may include silicon oxide $SiO_2$.

According to various embodiments, the display device may further include a fingerprint prevention layer coated on the anti-reflection layer.

According to various embodiments, the fingerprint prevention layer may include an anti-fingerprint (AF) coating.

According to various embodiments, the fingerprint prevention layer may include fluorine (F).

According to various embodiments, the combined thickness of the anti-reflection layer and the fingerprint prevention layer may be in the range of about 1600 to 2200 Å. The display device may further include a polarizer positioned between the display panel and the window.

According to various embodiments, the display device may further include an adhesive layer positioned between the polarizer and the window.

According to various embodiments, the display panel may include liquid crystals or an organic light emitting diode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which:

FIG. 4 is a table illustrating an experimental example of the display device of FIG. 1;

DETAILED DESCRIPTION

Figure 1:
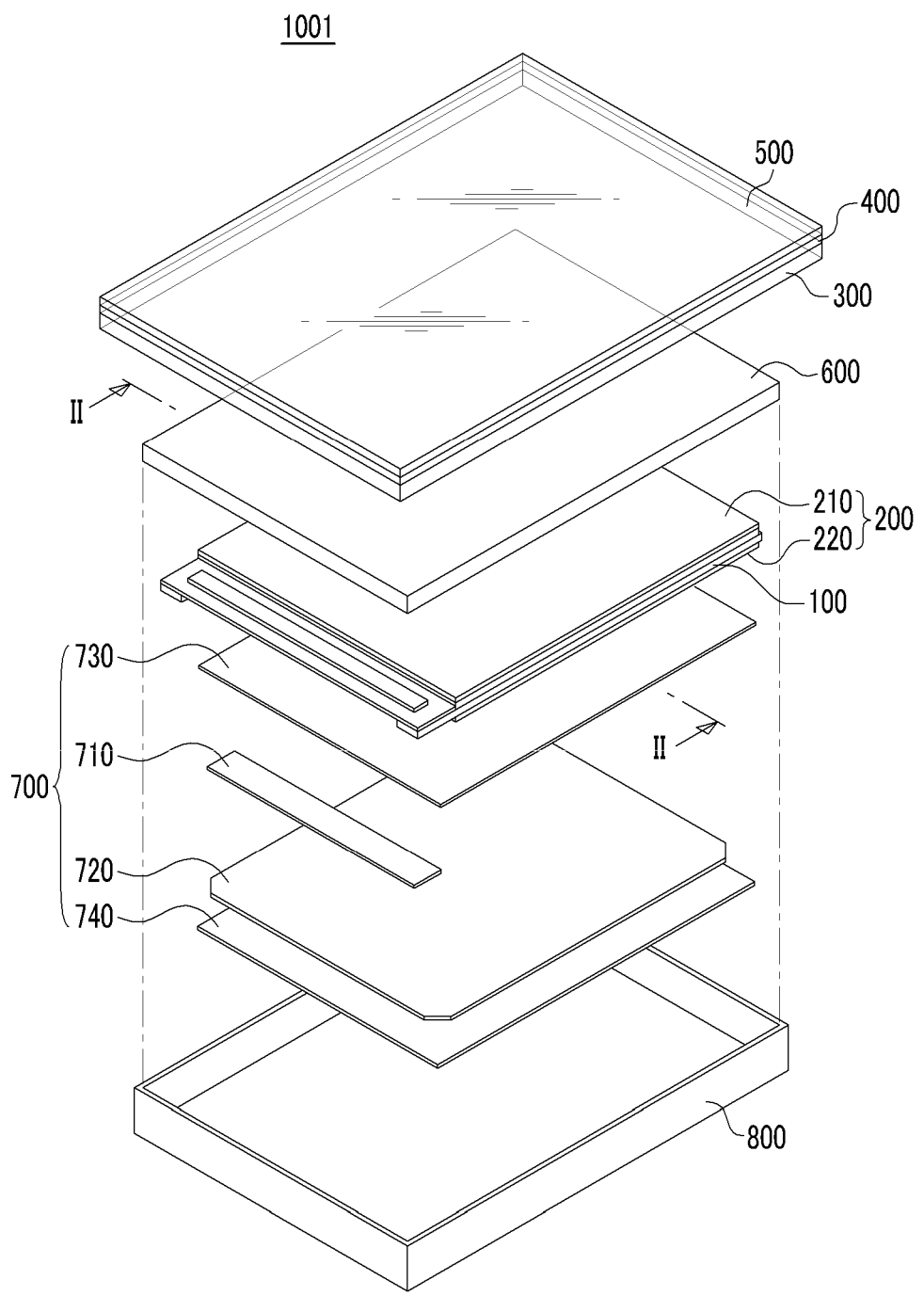
FIG. 1 is an exploded perspective view of a display device, according to a first exemplary embodiment.

The present invention will be described more fully hereinafter with reference to the accompanying drawings, in which exemplary embodiments of the invention are shown. As those skilled in the art would realize, the described embodiments may be modified in various ways, all without departing from the spirit or scope of the present invention.

The drawings and description are to be regarded as illustrative in nature and not restrictive. Like reference numerals designate like elements throughout the specification.

In addition, the size and thickness of each component shown in the drawings are arbitrarily shown for understanding and ease of description, but the present invention is not limited thereto. In the drawings, the thickness of layers, films, panels, regions, etc., are exaggerated for clarity. In the drawings, for understanding and ease of description, the thicknesses of some layers and areas are exaggerated. It will be understood that when an element such as a layer, film, region, or substrate is referred to as being "on" another element, it can be directly on the other element, or intervening elements may also be present.

In addition, unless explicitly described to the contrary, the word "comprise" and variations such as "comprises" or "comprising", will be understood to imply the inclusion of stated elements but not the exclusion of any other elements. Further, in the specification, "on" implies being positioned above or below a target element and does not imply being necessarily positioned on the top on the basis of a gravity direction.

Figure 2:
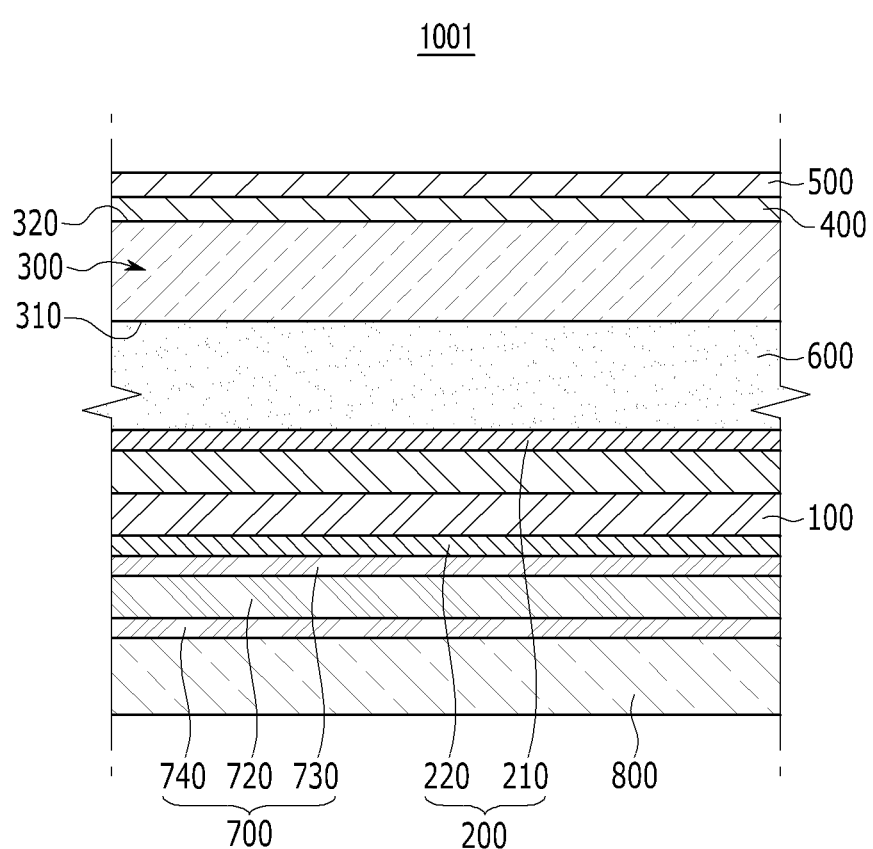
FIG. 2 is a cross-sectional view taken along line II-II of FIG. 1.

FIG. 1 is an exploded perspective view of the display device 1001, and FIG. 2 is a cross-sectional view taken along line II-II of FIG. 1. As shown in FIGS. 1 and 2, the display device 1001 includes a display panel 100, a polarizer 200, a window 300, an anti-reflection layer 400, a fingerprint prevention layer 500, a resin layer 600, a backlight unit 700, and a receiving member 800.

The display panel 100 includes liquid crystals. The display panel 100 forms an image, by using the liquid crystals to control light radiated from the backlight unit 700. The display panel 100 includes opposing substrates, between which the liquid crystals are positioned. A wire is formed on at least one of the substrates, and the liquid crystals are moved by a magnetic field generated by the wire, such that the quantity of light transmitted through the display panel 100 is controlled, so as to form an image on the display panel 100.

The polarizer 200 converts an optical axis of light radiated to the display panel 100 and emitted from the display panel 100. The polarizer 200 includes a first polarizer 210 and a second polarizer 220, which are attached to a front surface and a rear surface of the display panel 100. The first polarizer 210 is positioned between the display panel 100 and the window 300 and has an optical axis crossing an optical axis of the second polarizer 220. That is, the first polarizer 210 and the second polarizer 220 have the optical axes that cross each other.

The window 300 faces the display panel 100 and is made of a transparent material, such as glass, plastic, or resin, and serves to protect the display panel 100 from external impacts. The window 300 faces and covers the display panel 100. The window 300 is attached to the display panel 100 by the resin layer 600, which also improves the impact-resistance of the display device 1001. The window 300 is generally larger than the display panel 100, but the present disclosure is not limited thereto. For example, the window 300 may have the substantially same size as the display panel 100.

The window 300 includes a first surface 310 facing the display panel 100 and an opposing second surface 320. The second surface 320 is coated with the anti-reflection layer 400.

Figure 3:
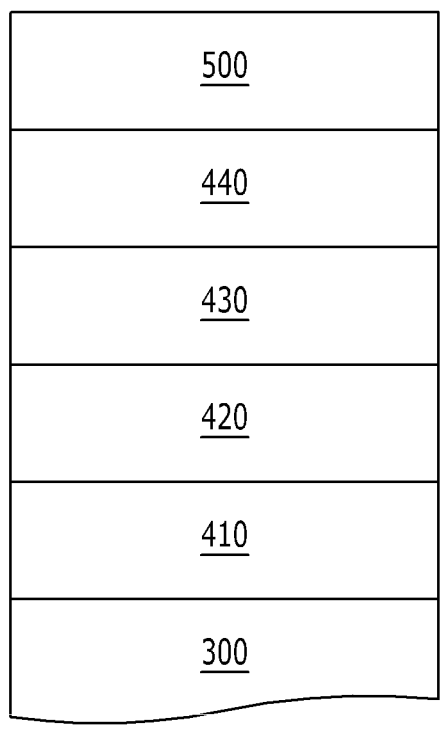
FIG. 3 is a cross-sectional view specifically illustrating an anti-reflection layer and a fingerprint prevention layer, of the display device of FIG. 1.

FIG. 3 is a cross-sectional view specifically illustrating the anti-reflection layer 400 and the fingerprint prevention layer 500. As shown in FIG. 3, the window 300 is coated with the anti-reflection layer 400, which serves to prevent external light from being reflected by the window 300 and the display panel 100. The anti-reflection layer 400 includes an anti-reflection (AR) coating and improves the transmittance of the display device 1001, by preventing the external light from being reflected by the window 300 and the display panel 100.

The anti-reflection layer 400 may be made of at least one of an organic material, an inorganic material, and a polymer. Materials having different refractive indexes may be mixed with each other and laminated, and a regular or irregular pattern may be formed on the surface. As one example, the anti-reflection layer 400 includes a first sub-layer 410, a second sub-layer 420, a third sub-layer 430, and a fourth sub-layer 440.

The first sub-layer 410, the second sub-layer 420, the third sub-layer 430, and the fourth sub-layer 440 may have different thicknesses. The first sub-layer 410 and the third sub-layer 430 may include titanium oxide $TiO_2$, and the second sub-layer 420 and the fourth sub-layer 440 may include silicon oxide $SiO_2$. That is, the sub-layers 410, 420, 430, 440 have different thicknesses and different refractive indexes, and are laminated to each other. Therefore, light that is radiated to the anti-reflection layer 400 from external sources, the backlight unit 700, and via reflection from the window 300 or the display panel 100, is regularly or irregularly refracted, to thereby prevent the external light from being reflected by the window 300 and the display panel 100.

As described above, the surface of the display device 1001, which is the second surface 320 of the window 300, is coated with the anti-reflection layer 400, to prevent the external light from being reflected. As a result, the transmittance of the window 300 is improved, to maximize the luminance characteristics of the display device 1001. Therefore, the field visibility of an image displayed by the display device 1001 is improved.

The anti-reflection layer 400 is coated with the fingerprint prevention layer 500. The fingerprint prevention layer 500 includes an anti-fingerprint (AF) coating and serves to protect the anti-reflection layer 400. The fingerprint prevention layer 500 may be made of an organic material, an inorganic material, and/or a polymer, and may be formed by mixing or laminating materials having different rigidities. As one example, the fingerprint prevention layer 500 includes fluorine (F), to prevent external pollutants from being absorbed by the anti-reflection layer 400. That is, the fingerprint prevention layer 500 prevents the anti-reflection layer 400 from damage and pollution.

More specifically, in the anti-reflection layer 400, materials having different refractive indexes are mixed or laminated, so as to form regular or irregular patterns on the window 300, such that the anti-reflection layer 400 is positioned while surface activation energy is high. If the anti-reflection layer 400 is exposed to pollution and then the anti-reflection layer 400 is washed, there is a possibility that the anti-reflection layer 400 will be damaged during the washing. However, the fingerprint prevention layer 500 prevents the anti-reflection layer 400 from being polluted. In addition, the fingerprint prevention layer 500 prevents direct contact between a user's hand and the anti-reflection layer 400 and prevents dust from adhering to the anti-reflection layer 400, thereby preventing the anti-reflection layer 400 from being damaged.

Hereinafter, referring to FIG. 4, a test measuring the average reflective index and the average transmittance of display devices, including the anti-reflection layer 400 and the fingerprint prevention layer 500 coated on the window 300, will be described in detail. As shown in FIG. 4, in each of Experimental Examples 1 to 7, the average reflective index and the average transmittance of the display devices are measured, while varying the thicknesses of the first sub-layer 410, the second sub-layer 420, the third sub-layer 430, the fourth sub-layer 440, and the fingerprint prevention layer 500, and while maintaining the total thickness of the anti-reflection layer 400 and the fingerprint prevention layer 500, within the range of 1600 to 2200 Å.

As shown in FIG. 4, in each of Experimental Examples 1 to 7, the display devices showed a low average transmittance of from 0.6 to 0.7% and a high average transmittance of from 93 to 95%, by coating the anti-reflection layer 400 and the fingerprint prevention layer 500 on the window 300. That is, as verified through the test, the anti-reflection layer 400 and the fingerprint prevention layer 500 maximize the luminance characteristics of images displayed by the display devices.

Referring back to FIGS. 1 and 2, the resin layer 600 is positioned between the window 300 and the display panel 100. The resin layer 600 is also positioned within the receiving member 800, so as to cover the display panel 100. As such, the resin layer 600 prevents air gaps from being formed between the display panel 100 and the window 300, and between the display panel 100 and the receiving member 800.

Accordingly, the resin layer 600 prevents foreign material, such as dust and the like, from being disposed between the display panel 100 and the window 300, or between the display panel 100 and the receiving member 800. Accordingly, image quality is maintained. Further, the resin layer 600 serves to attach the window 300 to the display panel 100, thereby improving the impact-resistance of the display device 1001.

The backlight unit 700 radiates light to the display panel 100 and includes a light emitting unit 710, a light guiding plate 720, an optical sheet 730, and a reflection sheet 740. The light emitting unit 710 generates light and is positioned at the periphery of the light guiding plate 720. The light generated by the light emitting unit 710 is radiated to the light guiding plate 720, where the light is radiated towards the display panel 100. The light emitting unit 710 may be a point light source or a line light source.

The light guiding plate 720 is positioned between the optical sheet 730 and the reflection sheet 740 and serves to convert the light radiated from the light emitting unit 710 into a surface light source that radiates the light to the display panel 100. The optical sheet 730 serves to improve the display quality of the images implemented by the display panel 100, by transforming the light radiated from the light guiding plate 720. The optical sheet 730 may include a diffusion sheet, a prism sheet, and a protection sheet.

The reflection sheet 740 is positioned between the light guiding plate 720 and the receiving member 800. The reflection sheet 740 serves to reflect the light radiated through the light guiding plate 720 to the reflection sheet 740, back to the light guiding plate 720.

The display device 1001 may further include a mold frame (not shown) supporting the backlight unit 700 and the display panel 100. The backlight unit 700, and the mold frame are received in the receiving member 800. The receiving member 800 receives the display panel 100 and the backlight unit 700, and may be made of a material having higher rigidity than the window 300. The receiving member 800 may be made of a metal, such as stainless steel, cold rolled steel, an aluminum-nickel-silver alloy, and the like.

As described above, in the display device, the anti-reflection layer 400 is coated on the second surface 320 of the window 300, to prevent the external light from being reflected by the window 300 and the display panel 100. As a result, the transmittance of the window 300 is improved, thereby maximizing the luminance and field visibility of the images displayed by the display device 1001.

Further, in the display device 1001, the anti-reflection layer 400 is coated on the window 300. Therefore, no anti-reflection layer needs to be coated on the display panel 100 or the polarizer 200, which simplifies the manufacturing of the display device 1001. That is, the manufacturing costs and duration of the display device 1001 are reduced.

Further, in the display device 1001, the fingerprint prevention layer 500 is coated on the anti-reflection layer 400, to prevent the anti-reflection layer 400 from being polluted, directly touched, or contacted by dust. Therefore, the display quality of the display device 1001 is maintained.

Figure 5:
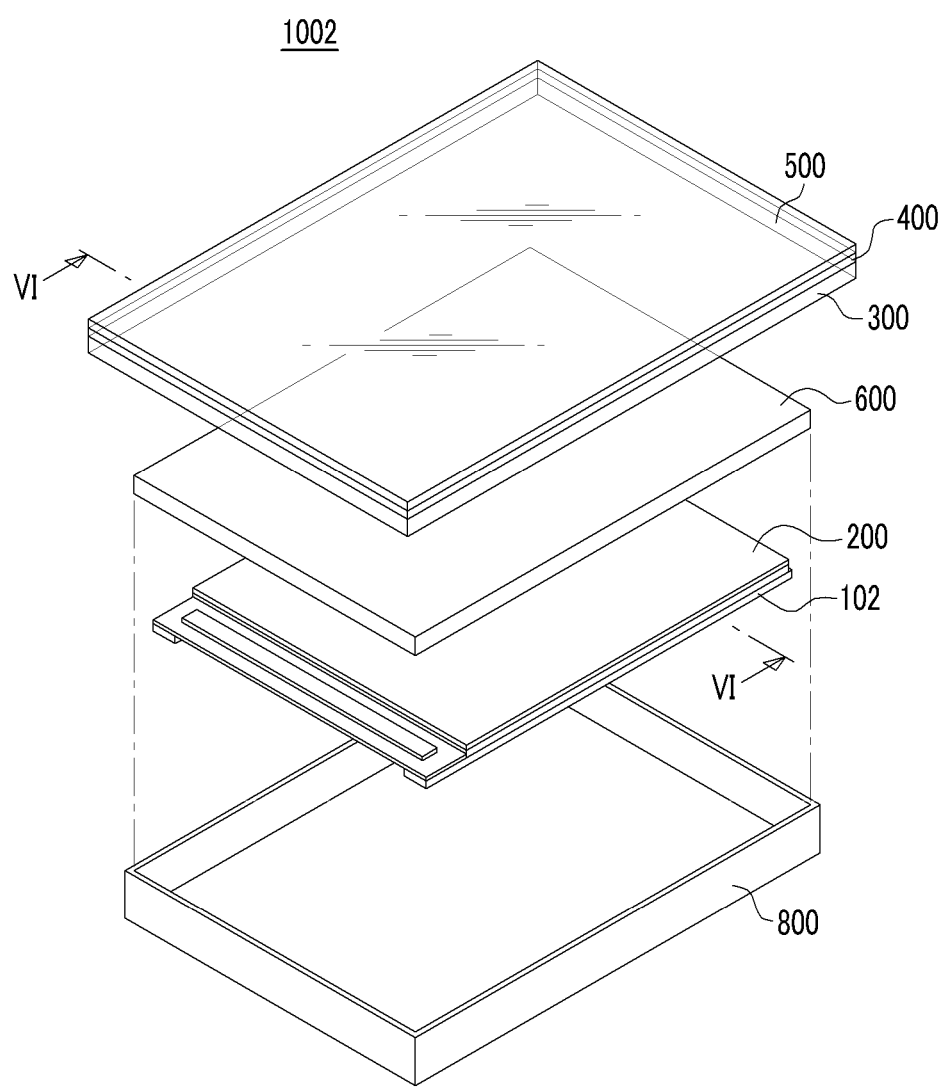
FIG. 5 is an exploded perspective view of a display device, according to a second exemplary embodiment.
Figure 6:
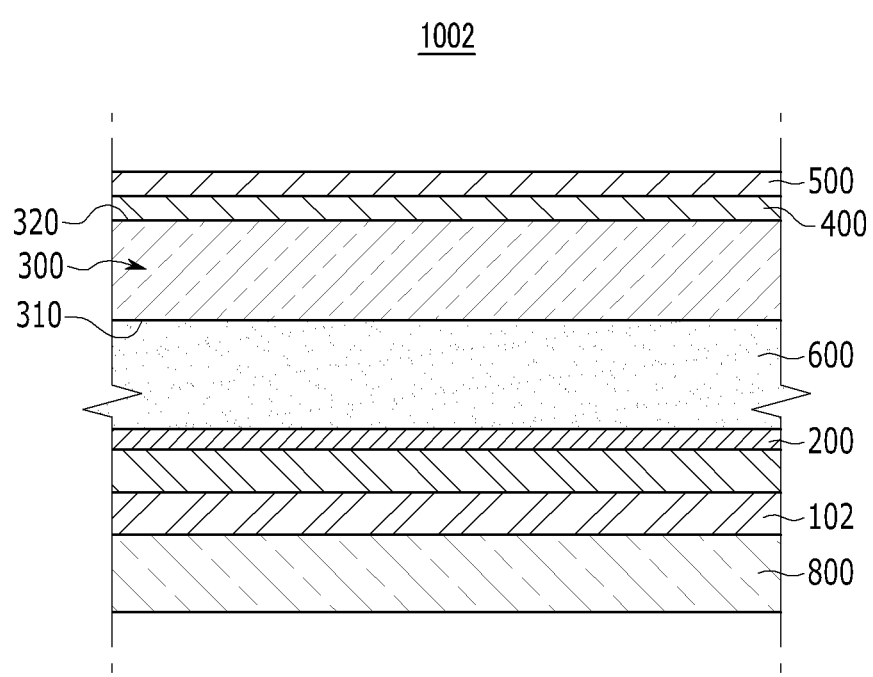
FIG. 6 is a cross-sectional view taken along line VI-VI of FIG. 5.

FIG. 5 is an exploded perspective view of a display device 1002, according to a second exemplary embodiment. FIG. 6 is a cross-sectional view taken along line VI-VI of FIG. 5. As shown in FIGS. 5 and 6, the display device 1002 includes a display panel 102, a polarizer 200, a window 300, an anti-reflection layer 400, a fingerprint prevention layer 500, a resin layer 600, and a receiving member 800.

The display panel 102 includes an organic light emitting diode and displays an image via light emitted by the organic light emitting diode. The display panel 102 includes opposing substrates, and the organic light emitting diode is positioned between the opposing substrates. A wire is formed on at least one of the substrates, and the light emission of the organic light emitting diode is controlled by the wire, so as to display an image.

The polarizer 200 converts an optical axis of light radiated from the display panel 102 and is attached to a front surface of the display panel 102. The anti-reflection layer 400 is coated on the second surface 320 of the window 300, and the fingerprint prevention layer 500 is coated on the anti-reflection layer 400.

As described above, in the display device 1002, the anti-reflection layer 400 is coated on the second surface 320 of the window 300, and the fingerprint prevention layer 500 is coated on the anti-reflection layer 400, to improve the field visibility of the display device 1002 and reduce manufacturing costs and processing time. The anti-reflection layer 400 is protected from damage, to preserve the display quality of the display device 1002.

While this disclosure has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device, comprising:
a display panel;
a window positioned on the display panel, having a first surface that faces the display panel and an opposing second surface; and
an anti-reflection layer on the second surface of the window, the anti-reflection layer including an anti-reflection coating having a plurality of layers, the plurality of layers having different thicknesses, wherein:
the plurality of layers includes a first layer, a second layer, a third layer, and a fourth layer in that order from the window, and
the third and fourth layers are each thicker than a combined thickness of the first and second layers.

2. The device of claim 1, wherein the plurality of layers have different refractive indexes.

3. The device of claim 1, wherein the first layer includes titanium oxide $TiO_2$, and the second layer includes silicon oxide $SiO_2$.

4. The device of claim 1, further comprising a fingerprint prevention layer on the anti-reflection layer.

5. The device of claim 4, wherein the fingerprint prevention layer includes an anti-fingerprint (AF) coating.

6. The device of claim 4, wherein the fingerprint prevention layer includes fluorine (F).

7. The device of claim 4, wherein the total thickness of the anti-reflection layer and the fingerprint prevention layer is in the range of about 1600 to 2200 Å.

8. The device of claim 4, further comprising a polarizer positioned between the display panel and the window.

9. The device of claim 8, further comprising an adhesive layer positioned between the polarizer and the window.

10. The device of claim 1, wherein the display panel includes liquid crystals or an organic light emitting diode.

11. The device of claim 1, further comprising a fingerprint prevention layer having a thickness of less than about 300 angstroms.

12. The device of claim 8, wherein there are substantially no air gaps between the window and the display panel.

13. The device of claim 1, wherein a surface of the anti-reflection layer has an irregular pattern.

* * * * *